(12) United States Patent
Dahlback

(10) Patent No.: US 11,200,635 B2
(45) Date of Patent: Dec. 14, 2021

(54) CONTROLLER AND METHOD FOR REDUCING A PEAK POWER CONSUMPTION OF A VIDEO IMAGE PROCESSING PIPELINE

(71) Applicant: Axis AB, Lund (SE)

(72) Inventor: Erik Dahlback, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 16/537,926

(22) Filed: Aug. 12, 2019

(65) Prior Publication Data

US 2020/0051204 A1  Feb. 13, 2020

(30) Foreign Application Priority Data

Aug. 13, 2018  (EP) .................................. 18188672

(51) Int. Cl.
*G06T 1/20* (2006.01)
*G06T 1/60* (2006.01)
*H04N 5/232* (2006.01)

(52) U.S. Cl.
CPC ................. *G06T 1/20* (2013.01); *G06T 1/60* (2013.01); *H04N 5/23229* (2013.01); *G09G 2340/0435* (2013.01)

(58) Field of Classification Search
CPC ......... G06T 1/20; G06T 1/60; H04N 5/23229; H04N 5/232; H04N 5/23241; H04N 5/217; G09G 2330/021; G09G 2340/0435; G09G 2350/00; G09G 5/395
See application file for complete search history.

(56) References Cited

U.S. PATENT DOCUMENTS

| 2001/0043177 A1* | 11/2001 | Huston ................ G09G 3/3648 345/87 |
| 2002/0024999 A1* | 2/2002 | Yamaguchi .......... H04N 19/527 375/240.03 |
| 2004/0008767 A1* | 1/2004 | Ueda .................... H04N 9/8042 375/240.01 |

(Continued)

FOREIGN PATENT DOCUMENTS

WO  2013/105913 A2  7/2013

OTHER PUBLICATIONS

Extended European Search Report dated Feb. 20, 2019 for the European Patent Application No. 18188672.2.
(Continued)

*Primary Examiner* — Abdelaaziz Tissire
(74) *Attorney, Agent, or Firm* — Volpe Koenig

(57) ABSTRACT

A video image processing pipeline controller is configured to control a bandwidth at which processing functions of a video image processing pipeline communicates, over one or more memory access channels, with a system memory. The controller is configured to, based on a current frame rate at which the video image processing pipeline produces a video stream and a target frame rate of the video image processing pipeline, reduce the bandwidth while securing that the current frame rate does not drop below the target frame rate, thereby reducing a peak power consumption of the video image processing pipeline. Also a video image processing system comprising the controller is disclosed as well as a method of reducing a peak power consumption in the video image processing pipeline.

17 Claims, 3 Drawing Sheets

(56) References Cited

U.S. PATENT DOCUMENTS

| | | | | |
|---|---|---|---|---|
| 2004/0184534 | A1* | 9/2004 | Wang | H04N 19/147 375/240.03 |
| 2008/0247672 | A1* | 10/2008 | Kaplinsky | G06T 3/4015 382/300 |
| 2009/0089782 | A1* | 4/2009 | Johnson | G06F 9/5027 718/100 |
| 2009/0204831 | A1 | 8/2009 | Cousson et al. | |
| 2010/0124271 | A1* | 5/2010 | Martz | H04N 19/137 375/240.01 |
| 2013/0262831 | A1 | 10/2013 | Nelson et al. | |
| 2014/0063025 | A1 | 3/2014 | Krig | |
| 2014/0267811 | A1* | 9/2014 | Bhat | H04N 5/23267 348/208.16 |
| 2014/0294096 | A1* | 10/2014 | Togo | H04L 65/4084 375/240.26 |
| 2015/0032913 | A1 | 1/2015 | Kim et al. | |
| 2015/0081989 | A1* | 3/2015 | Lee | G06F 12/0607 711/157 |
| 2015/0095666 | A1 | 4/2015 | Ananthakrishnan et al. | |
| 2016/0360148 | A1* | 12/2016 | Mahapatro | H04N 19/172 |
| 2017/0006320 | A1* | 1/2017 | Beattie, Jr. | H04N 21/2187 |
| 2019/0200024 | A1* | 6/2019 | Kubota | H04N 19/172 |

OTHER PUBLICATIONS

"A Heuristic for Peak Power Constrained Design of Network-on-Chip (NoC) based Multimode Systems"; Bhojwani et al.; VLSI Design, 2005, 18th International Conference on Kolkata, India Jan. 3-7, 2005; Piscataway, NJ, USA, IEEE (Jan. 3, 2005), pp. 124-129, XP10769843.

"Peak Power Control for a QoS Capable On-Chip Network"; Yuho et al.; Parallel Processing, 2005. ICPP 2005; International Conference on Oslo, Norway Jun. 14-17, 2005; Piscataway, NJ, USA, IEEE (Jun. 14, 2005), pp. 585-592 XP010820928.

* cited by examiner

CONTROLLER AND METHOD FOR REDUCING A PEAK POWER CONSUMPTION OF A VIDEO IMAGE PROCESSING PIPELINE

TECHNICAL FIELD

The present invention relates to reduction of peak power consumption in a video image processing pipeline. The present invention also relates to a video image processing pipeline controller and a video image processing system comprising such a controller, and further relates to a method of reducing a peak power consumption in a video image processing pipeline.

BACKGROUND

Typically, a video stream is produced by capturing a series of images using an image sensor. Alternatively, the series of images may be rendered by an image rendering engine.

As an image from the series of images is transferred into a video image processing pipeline, a plurality of processes will start working with it in order for producing a video frame. As a rule, the processes are finalized before a subsequent image, in the series of images, is transferred to the video image processing pipeline. The so produced video frames are forming a video stream.

This will result in a period of idle video image processing pipeline followed by that the video image processing pipeline is running at full capacity. This will result in uneven power consumption. Hence, the power consumption of the video image processing pipeline varies during production of one video frame. An example of the variation of power consumption of the video image processing pipeline is illustrated in FIG. 1. As seen, the characteristics of the power consumption of the video image processing pipeline is similar to a sinus wave with the same frequency as the frame rate. In FIG. 1 the time span of a video frame is indicated as FT, i.e. frame time. The variation in power consumption of the video image processing pipeline is due to the different power consumption of individual processes of the video image processing pipeline. The power consumption of four different individual processes of a video image processing pipeline building up the power consumption illustrated in FIG. 1 is illustrated in the FIG. 1 within the oval insert in the top of the figure as consumption diagrams a)-d).

Varying power consumption of the video image processing pipeline may have different drawbacks. For example, a powering unit powering the video image processing pipeline must be dimensioned according to the peak power consumption. Hence, there is a need for evening out the power consumption of the video image processing pipeline.

SUMMARY

According to a first aspect, a video image processing pipeline controller is provided. The video image processing pipeline controller is configured to control a bandwidth at which processing functions of a video image processing pipeline communicates, over one or more memory access channels, with a system memory. The video image processing pipeline controller is configured to, based on a current frame rate at which the video image processing pipeline produces a video stream and a target frame rate of the video image processing pipeline, reduce the bandwidth while securing that the current frame rate does not drop below the target frame rate, thereby reducing a peak power consumption of the video image processing pipeline.

Accordingly, the bandwidth available for communication with the system memory is tuned. Some or all of the processing functions of the video image processing pipeline communicating with the system memory will be choked. This will result in that the timing of these processing functions will shift or be prolonged. By, in time, shifting and/or prolonging the active time, of some or all of the processing functions of the video image processing pipeline, the power consumption may be held on a stable level. Hence, the peak power consumption may be lowered. If the bandwidth is reduced too much, the video processing pipeline will not be able to produce the video stream with the target frame rate. Hence, the reduction of bandwidth need to be controlled such that the current frame rate does not drop below the target frame rate. In other words, the controller is configured to reduce the bandwidth as much as possible while maintaining a constant frame rate. By controlling the bandwidth of the one or more memory access channels just right, the above can be achieved. The controlling algorithm uses two variables, the target frame rate and the current frame rate at which the video processing pipeline is producing the video stream. The controlling of the bandwidth in order to reduce the peak power consumption of the video image processing pipeline may run continuously in the background.

By reducing the peak power consumption of the video image processing pipeline the powering unit powering the video image processing pipeline may be dimensioned to deliver less power. For the example of using power over Ethernet, PoE, to power a camera comprising the video image processing pipeline, the PoE installation may be dimensioned to deliver less power than without the present reduction of peak power. Hence, if peak power decreases, the power needed to be delivered by a PoE aggregate may also decrease. Alternatively, the PoE aggregate may be used for powering more cameras.

Instead of dimensioning down the powering unit, the excess power may be used by other processes in a device comprising the video image processing pipeline.

The video image processing pipeline controller may further be configured to decrease the bandwidth in steps. The decrease of the bandwidth in steps may be made until the current frame rate drops below the target frame rate. The video image processing pipeline controller may further be configured to, in response to the current frame rate drops below the target frame rate, increase the bandwidth to a bandwidth at which the current frame rate does not drop below the target frame rate.

The video image processing pipeline controller may further be configured to, in response to the current frame rate drops below the target frame rate, increase the bandwidth to a smallest previous bandwidth at which the current frame rate did not drop below the target frame rate.

The target frame rate may be an original frame rate. The original frame rate may be read out from the video source producing the video image data for the video image pipeline. The original frame rate may be read out before regulation of the bandwidth.

The video image processing pipeline controller may further be configured to globally control the bandwidth of a plurality of memory access channels.

The video image processing pipeline controller may further be configured to individually control the bandwidth in each of a plurality of memory access channels. In order to achieve as good and even control of the power consumption of the video image pipeline as possible, it may be advantageous to control different memory access channels differently. This may possibly be made using an actual measured or estimated power consumption as feedback.

According to a second aspect, a video image processing system is provided. The video image processing system comprises: a video source configured to provide video image data; a video image processing pipeline comprising a plurality of processing functions, wherein each processing function is configured to process the video image data; a system memory, wherein the processing functions of the image processing pipeline are configured to access the system memory via one or more memory access channels; and a video image processing pipeline controller according to the first aspect The above mentioned features of the video image processing pipeline controller, when applicable, apply to this second aspect as well. In order to avoid undue repetition, reference is made to the above.

The video image processing pipeline may comprise two or more of the following processing functions: image sensor correction function, noise reduction function, image scaling function, gamma correction function, image enhancement function, color space conversion function, chroma subsampling function, compression function, data storage function and data transmission function.

A processing function of the video image processing pipeline may be implemented as a computer software portion run on a general purpose processor or on a graphics processing unit, a field-programmable gate array, a fixed-function application-specific integrated circuit, or an analog circuit.

The image source may be an image sensor. The image source may be an image rendering engine.

The video image processing system may further comprise: an electrical power consuming unit; and an electrical power managing unit configured to monitor the electrical power saved by the controlling of the bandwidth at which the image processing pipeline communicates with the system memory, and to distribute at least a fraction of the saved electrical power to the electrical power consuming unit.

The image processing system may be implemented in a camera. The camera may be a monitoring camera.

According to a third aspect, a method of reducing a peak power consumption in a video image processing pipeline is provided. The video image processing pipeline is configured to process video image data into a video stream, the video image processing pipeline comprising a plurality of processing functions, wherein each processing function is configured to process video image data, and while processing of video image data, the processing functions are configured to access a system memory over one or more memory access channels. The method comprising: storing a target frame rate of the video image processing pipeline; and based on a current frame rate at which the video image processing pipeline produces the video stream and the target frame rate, reducing, by a video image processing pipeline controller, a bandwidth, at which processing functions communicates over the one or more memory access channels with the system memory, while securing that the current frame rate does not drop below the target frame rate. The target frame rate of the video image processing pipeline may be stored in a memory.

The act of reducing the bandwidth may comprise decreasing the bandwidth in steps until the current frame rate drops below the target frame rate, and, in response to the current frame rate drops below the target frame rate, increasing the bandwidth to a bandwidth at which the current frame rate does not drop below the target frame rate.

The act of reducing the bandwidth may further comprise, in response to the current frame rate drops below the target frame rate, increasing the bandwidth to a smallest previous bandwidth at which the current frame rate did not drop below the target frame rate.

The above mentioned features of the controller and the system, when applicable, apply to this third aspect as well. In order to avoid undue repetition, reference is made to the above.

According to a fourth aspect, a non-transitory computer readable recording medium having recorded thereon program code which when executed at a device having processing capabilities is configured to perform the method according to the third aspect.

A further scope of applicability will become apparent from the detailed description given below. However, it should be understood that the detailed description and specific examples, while indicating preferred embodiments, are given by way of illustration only, since various changes and modifications will become apparent to those skilled in the art from this detailed description.

Hence, it is to be understood that the teachings are not limited to the particular component parts of the device described or acts of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects will now be described in more detail, with reference to appended drawings showing embodiments. The figures should not be considered limiting to the specific embodiment; instead they are used for explaining and understanding the teachings herein.

As illustrated in the figures, the sizes of layers and regions may be exaggerated for illustrative purposes and, thus, are provided to illustrate the general structures of embodiments. Like reference numerals refer to like elements throughout.

DETAILED DESCRIPTION

The present system will now be described more fully hereinafter with reference to the accompanying drawings, in which currently preferred embodiments are shown. However, it may be embodied in many different forms and should not be construed as limited to the embodiments set forth herein; rather, these embodiments are provided for thoroughness and completeness, and to fully convey the scope to the skilled person.

Figure 2:
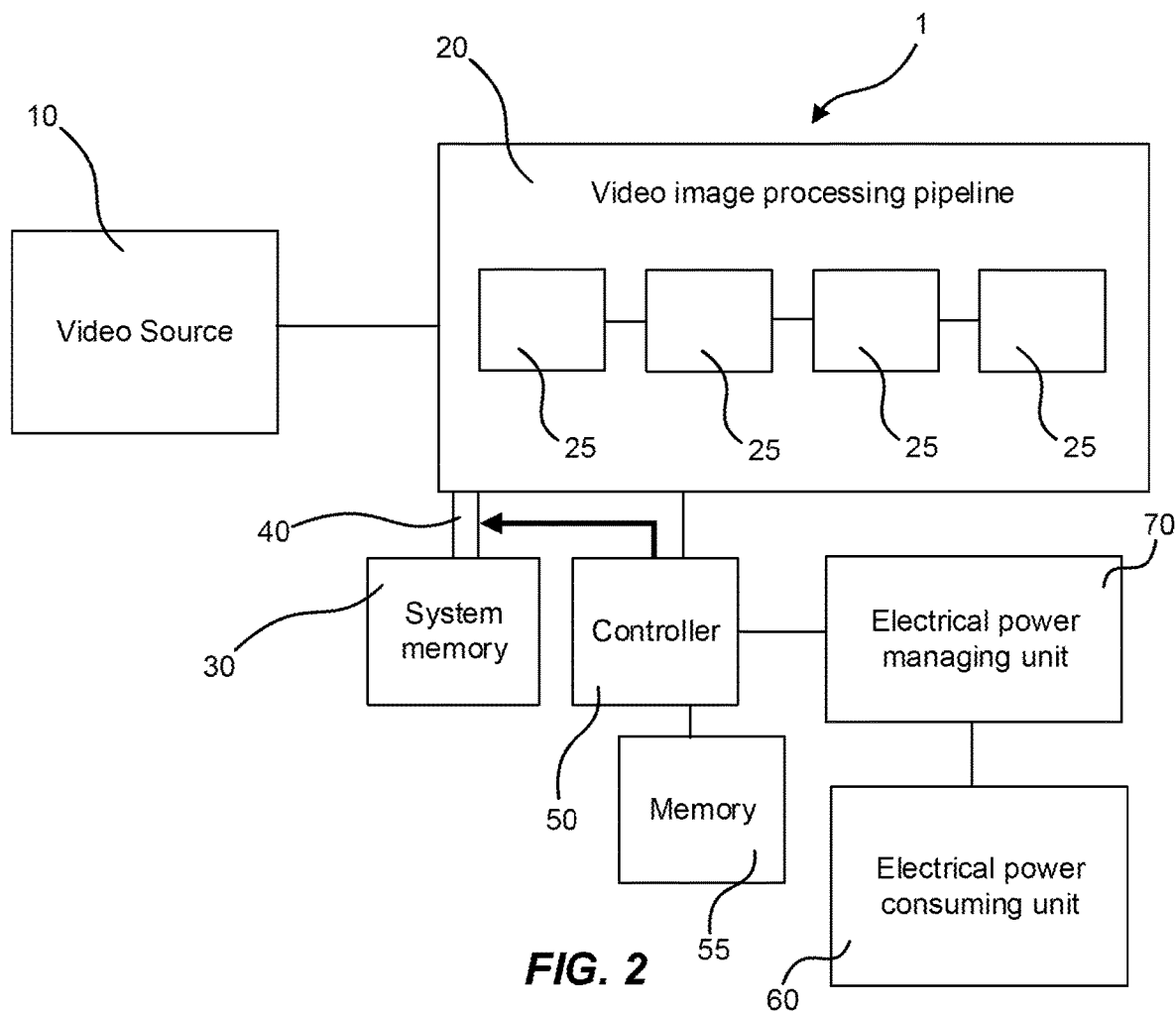
FIG. 2 schematically illustrates a video image processing system.

FIG. 2 illustrates a video image processing system 1. The video image processing system 1 comprises a video source 10, a video image processing pipeline 20, a system memory 30, one or more memory access channels 40, and a video image processing pipeline controller 50.

The video source 10 is configured to provide video image data. The video image data may be a series of images. The video source 10 may be an image sensor. The image sensor is configured to capture the video image data. The image sensor may form part of a video camera. Alternatively, or in combination, the video source 10 may be an image rendering engine. The image rendering engine is configured to render the video image data. The image rendering engine may be configured to render photorealistic or non-photorealistic images from a 2D or 3D model by means of a computer program. The video source 10 is configured to transfer the video image data to the video image processing pipeline 20.

The video image processing pipeline 20 is configured to process the video image data into video frames. The video image processing pipeline 20 comprises a plurality of processing functions 25. Each processing function 25 is configured to process the video image data. Some of the plurality of processing functions 25 may be dependent on each other. Hence, they need to be executed one after another. Some of the plurality of processing functions 25 may be independent on each other. Hence, they may be executed in parallel. The processes of the plurality of processing functions 25 are typically finalized well before a subsequent image, in the series of images, is transferred to the video image processing pipeline 20.

The video image processing pipeline 20 comprises two or more of the following processing functions 25: an image sensor correction function, a noise reduction function, an image scaling function, a gamma correction function, an image enhancement function, a color space conversion function, a chroma subsampling function, a compression function, a data storage function, and a data transmission function. The image sensor correction function may comprise a Bayer filter. The color space conversion function may comprise conversions between different formats, such as RGB, YUV and YCbCr.

A specific processing function 25 of the video image processing pipeline 20 may be implemented as a computer software portion run on a general purpose processor or on a graphics processing unit, a field-programmable gate array, a fixed-function application-specific integrated circuit, or an analog circuit. Every one of the plurality of processing functions 25 may be implemented using the same type of implementation. Different ones of the plurality of processing function 25 may be implemented using different implementations of the processing function 25. A subset of the plurality of processing functions 25 may be implemented using the same type of implementation. Accordingly, the processing function 25 of the video image processing pipeline 20 may be implemented as software, dedicated hardware or firmware, or some combination of dedicated hardware, firmware and/or software.

The system memory 30 is a memory used by the processing function 25 while processing the video image data into video frames. The system memory 30 may be a volatile memory, such as a random-access memory, RAM.

The processing functions 25 of the image processing pipeline 20 are configured to access the system memory 30 via the one or more memory access channels 40. The one or more memory access channels may be direct memory access, DMA, channels. The processing functions 25 of the image processing pipeline 20 may be configured to access the system memory 30 via a single memory access channel 40. The processing functions 25 of the image processing pipeline 20 may be configured to access the system memory 30 via a plurality of memory access channels 40.

The video image processing pipeline controller 50 is configured to control a bandwidth of the one or more memory access channels 40. In case of a plurality of memory access channels 40, the video image processing pipeline controller 50 may be configured to control the bandwidth of each memory access channel 40 individually. Hence, the bandwidth in each memory access channel 40 may be controlled independent from the bandwidths in the other memory access channels 40. In order to achieve as good and even control of the power consumption of the video image pipeline 20 as possible, it may be advantageous to control different memory access channels differently. This may possibly be made using an actual measured or estimated power consumption as feedback. The actual power consumption may be given by an electrical power managing unit 70. Alternatively, in case of a plurality of memory access channels 40, the video image processing pipeline controller 50 may be configured to control the bandwidth of the memory access channels 40 globally. Hence, the bandwidths of the plurality of memory access channels may be controlled together controlling a total bandwidth of the one or more memory access channels 40. Hence, the video image processing pipeline controller 50 is configured to control the bandwidth at which processing functions 25 of the video image processing pipeline 20 communicates, over the one or more memory access channels 40, with the system memory 30. The video image processing pipeline controller 50 is configured to control the bandwidth such that the bandwidth is reduced. The controlling of the bandwidth is made based on a current frame rate at which the video image processing pipeline 20 produces the video stream and a target frame rate of the video image processing pipeline 20. The target frame rate may be stored in a memory 55 of the video image processing system 1. The target frame rate may be an original frame rate of the video stream. The original frame rate may be the frame rate at which the video source is producing the series of images. The reduction of the bandwidth is controlled such that it is secured that the current frame rate does not drop below the target frame rate. Hence, the bandwidth may be controlled based on the current frame rate with the original frame rate as target.

Figure 1:
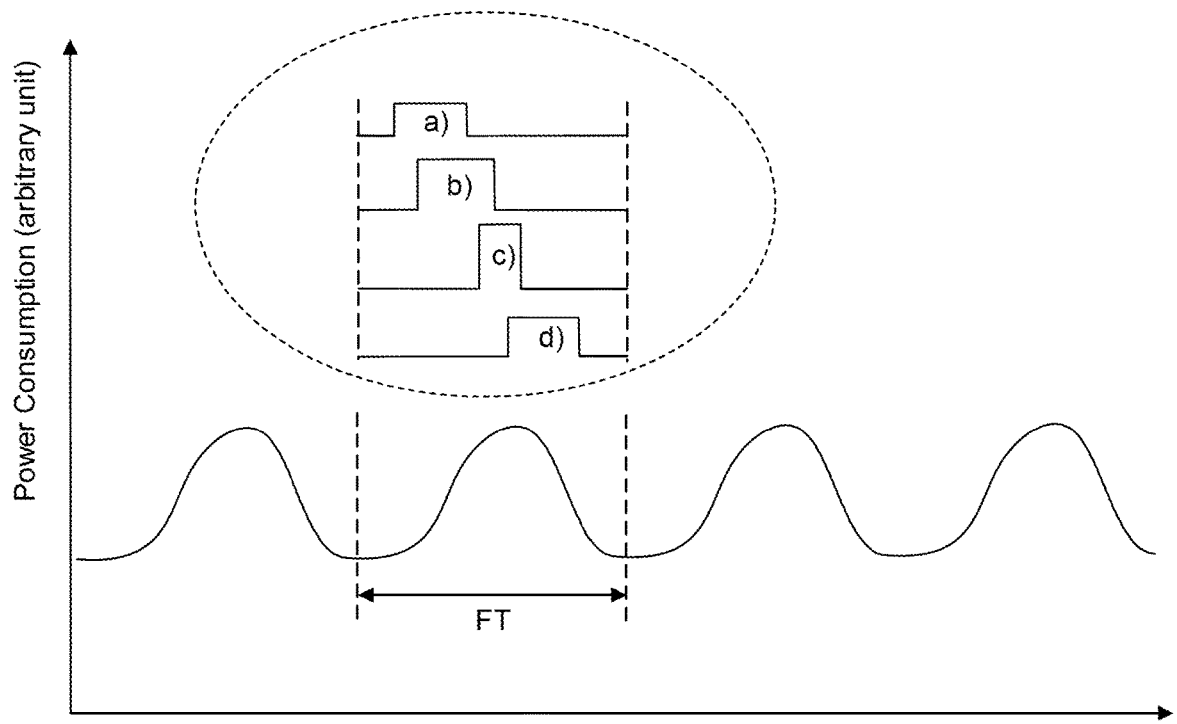
FIG. 1 schematically illustrates power consumption of a prior art video image processing pipeline over a plurality of frame times as well as power consumption of four different individual processes of the prior art video image processing pipeline.
Figure 3:
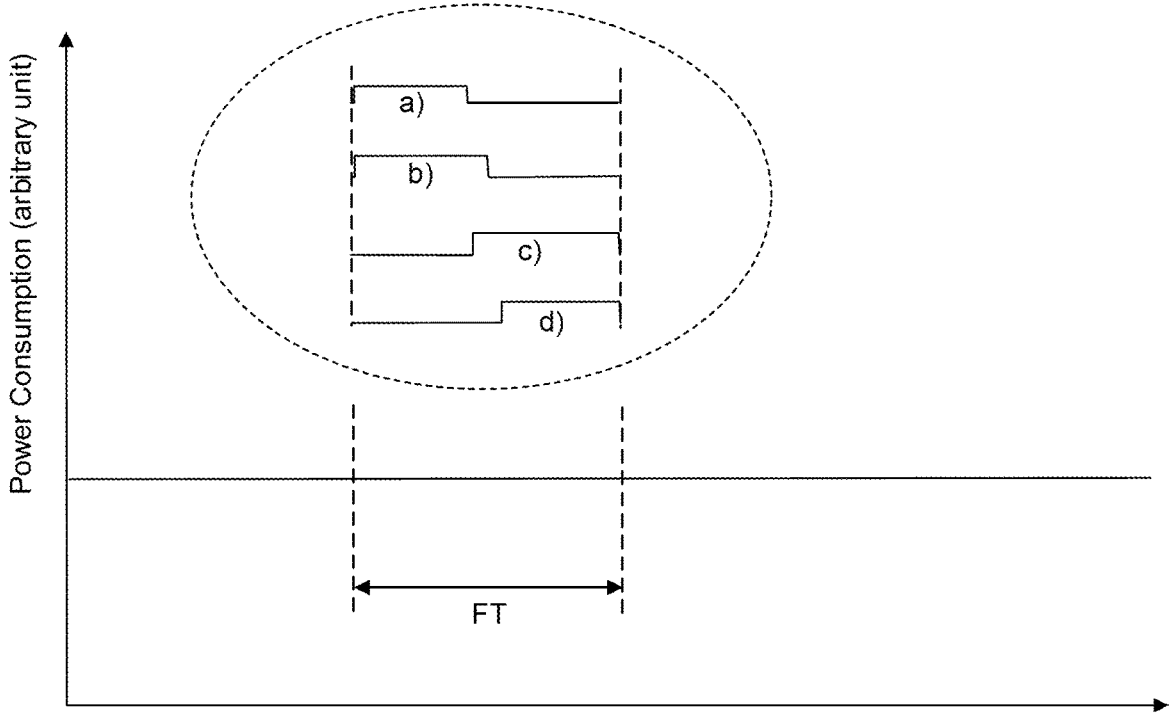
FIG. 3 schematically illustrates power consumption of a video image processing pipeline over a plurality of frame times as well as power consumption of four different individual processes of the video image processing pipeline.

By controlling the bandwidth of the one or more memory access channels 40 in accordance with this scheme a reduction of a peak power consumption of the video image processing pipeline 20 may be achieved. This since a reduction in the bandwidth induces a shift in and/or prolongs the active time, within a frame time, of the processing functions 25. By shifting and/or prolonging the active time the power consumption can be held on a stable level. Hence, the peak power consumption may be lowered. This is schematically illustrated in connection with FIG. 3. Within the oval insert in the top of FIG. 3 the power consumption of the four different individual processes of the video image processing pipeline 20 building up the power consumption as illustrated in FIG. 1 are schematically illustrated after a reduction of the bandwidth according to the above scheme. The reduction of the bandwidth may result in that an execution of a specific processing function 25 is spread out in time. This may imply that the power consumption for that specific processing function 25 is also spread out in time. This is illustrated in the oval insert in the top of FIG. 3, wherein the power consumption of the different processes a)-d) related to the different processing functions 25 are spread out in time as compared with a video image processing system run without reducing the bandwidth, the latter is schematically illustrated in FIG. 1. Alternatively, or in combination, the reduction of the bandwidth may result in that an execution of a specific processing function 25 is shifted in time. This is also illustrated in the oval insert in the top of FIG. 3, wherein the power consumption of the processes a) and b) are shifted in time as compared with a video image processing system run without reducing the bandwidth, the latter is schematically illustrated in FIG. 1.

As mentioned above, some of the plurality of processing functions 25 may be dependent on each other. In the example illustrated in FIGS. 1 and 3 processes a) and c) are depended on each other and processes b) and d) are dependent on each other. Hence, they are executed one after another. Further, also as mentioned above, some of the plurality of processing functions 25 may be independent on each other. For example, in the example illustrated in FIGS. 1 and 3 process a) is independent on processes b) and d). Hence, process a) may be executed in parallel with processes b) and/or d).

The video image processing pipeline controller 50 may be configured to tune the bandwidth, at which the processing functions 25 of the image processing pipeline 20 communicates, over the one or more memory access channels 40, with the system memory 30, until the peak power is minimized.

The video image processing pipeline controller 50 may further be configured to decrease the bandwidth, at which the processing functions 25 of the image processing pipeline 20 communicates, over the one or more memory access channels 40, with the system memory 30, in steps. The bandwidth may be reduced in steps until the current frame rate drops below the target frame rate. In response to the current frame rate drops below the target frame rate, the video image processing pipeline controller 50 may be configured to increase the bandwidth to a bandwidth at which the current frame rate does not drop below the target frame rate. This may, for example, be made by increasing the bandwidth to a smallest previous bandwidth at which the current frame rate did not drop below the target frame rate.

The video image processing system 1 may further comprise an electrical power consuming unit 60 and an electrical power managing unit 70.

The electrical power consuming unit 60 may be one or more of an illuminator device configured to illuminate a scene viewed by the video source 10, a pan/tilt motor configured to pan/tilt the video source 10, and a cooling arrangement configured to cool one or more components of the system 1.

The electrical power managing unit 70 is configured to monitor the electrical power saved by the controlling of the bandwidth at which the image processing pipeline 20 communicates, over the one or more memory access channels 40, with the system memory 30. The electrical power managing unit 70 may further be configured to distribute at least a fraction of the saved electrical power to the electrical power consuming unit 60.

Figure 4:
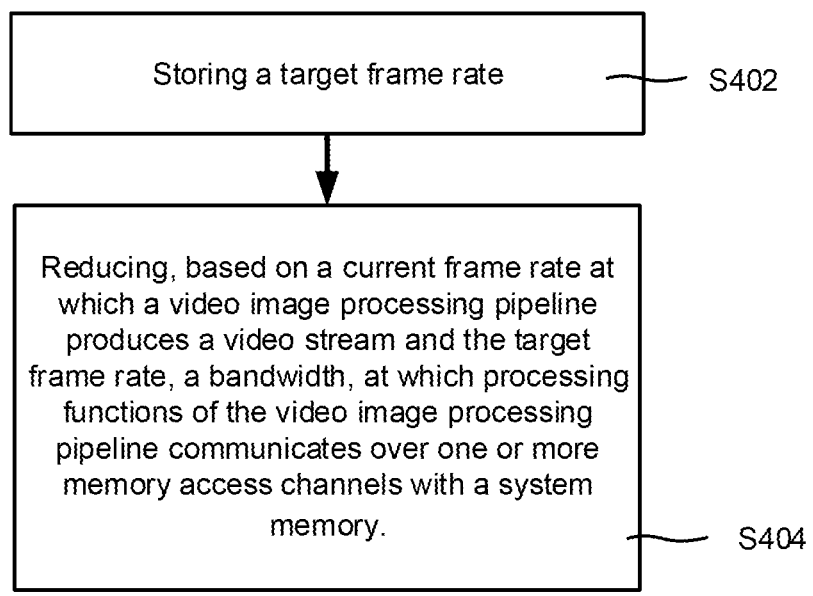
FIG. 4 is a block scheme of a method of reducing a peak power consumption in a video image processing pipeline.

In connection with FIG. 4, a method of reducing a peak power consumption in the video image processing pipeline 20 will be discussed. The method comprises the following acts. Storing S402 the target frame rate of the video image processing pipeline 20. The target frame rate may be stored in the memory 55 of the video image processing system 1. Reducing S404, based on a current frame rate at which the video image processing pipeline 20 produces the video stream and the target frame rate, a bandwidth, at which processing functions 25 communicates over the one or more memory access channels 40 with the system memory 30. The reducing S404 is performed such that it is secured that the current frame rate does not drop below the target frame rate. The act of reducing S404 may be performed by a video image processing pipeline controller 50. The act of reducing S404 the bandwidth may comprise decreasing the bandwidth in steps until the current frame rate drops below the target frame rate, and, in response to the current frame rate drops below the target frame rate, increasing the bandwidth to a bandwidth at which the current frame rate does not drop below the target frame rate. The act of reducing S404 the bandwidth may further comprise, in response to the current frame rate drops below the target frame rate, increasing the bandwidth to a smallest previous bandwidth at which the current frame rate did not drop below the target frame rate.

The person skilled in the art realizes that the above description is by no means limited to the preferred embodiments described above. On the contrary, many modifications and variations are possible within the scope of the appended claims.

Figure 5:
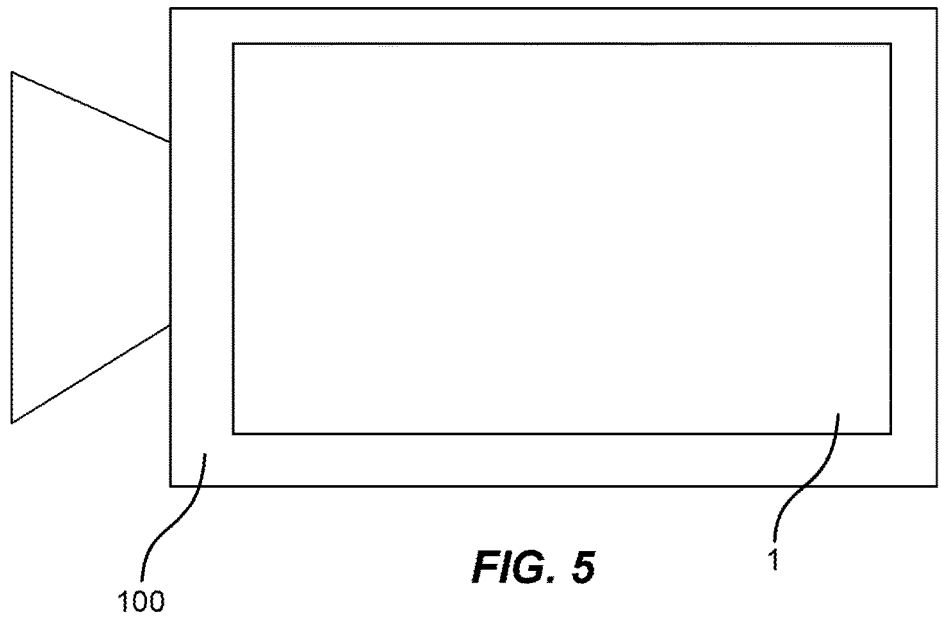
FIG. 5 schematically illustrates a camera comprising the video image processing system of FIG. 2.

For example, the video image processing system may be implemented in a camera 100. This is illustrated in connection with FIG. 5. The camera 100 may be a monitoring camera. In case the system is implemented in the camera 100, the electrical power consuming unit 60 may be one or more of an illuminator device configured to illuminate a scene viewed by the camera 100, a pan/tilt motor configured to pan/tilt the camera 100, and a cooling arrangement configured to cool the camera 100.

Additionally, variations to the disclosed embodiments can be understood and effected by the skilled person from a study of the drawings, the disclosure, and the appended claims.

The invention claimed is:

1. A video image processing pipeline controller comprising:
    circuitry configured to:
        control a bandwidth available for communications between processing functions of a video image processing pipeline and a system memory over one or more memory access channels;
        based on a current frame rate at which the video image processing pipeline produces a video stream and a target frame rate of the video image processing pipeline, reduce the bandwidth while securing that the current frame rate does not drop below the target frame rate to reduce a peak power consumption of the video image processing pipeline, wherein the bandwidth is reduced in steps until the current frame rate drops below the target frame rate; and
        in response to the current frame rate being reduced below the target frame rate, increase the bandwidth to a bandwidth at which the current frame rate does not drop below the target frame rate.

2. The video image processing pipeline controller according to claim 1, wherein the circuitry is further configured to, in response to the current frame rate drops below the target frame rate, increase the bandwidth to a smallest previous bandwidth at which the current frame rate did not drop below the target frame rate.

3. The video image processing pipeline controller according to claim 1, wherein the target frame rate is an original frame rate.

4. The video image processing pipeline controller according to claim 1, wherein the circuitry is further configured to globally control the bandwidth of a plurality of memory access channels.

5. The video image processing pipeline controller according to claim 1, wherein the circuitry is further configured to individually control the bandwidth in each of a plurality of memory access channels.

6. A video image processing system comprising:
a video source configured to provide video image data;
a video image processing pipeline comprising a plurality of processing functions, wherein each processing function is configured to process the video image data;
a system memory, wherein the processing functions of the image processing pipeline are configured to access the system memory via one or more memory access channels; and
a video image processing pipeline controller configured to control a bandwidth available for communications using one or more memory access channels between processing functions of a video image processing pipeline and a system memory,
wherein the video image processing pipeline controller is configured to:
based on a current frame rate at which the video image processing pipeline produces a video stream and a target frame rate of the video image processing pipeline, reduce the bandwidth while securing that the current frame rate does not drop below the target frame rate to reduce a peak power consumption of the video image processing pipeline, wherein the bandwidth is reduced in steps until the current frame rate drops below the target frame rate; and
in response to the current frame rate being reduced below the target frame rate, increase the bandwidth to a bandwidth at which the current frame rate does not drop below the target frame rate.

7. The video image processing system according to claim 6, wherein a processing function of the video image processing pipeline is implemented as a computer software portion run on a general purpose processor or on a graphics processing unit, a field-programmable gate array, a fixed-function application-specific integrated circuit, or an analog circuit.

8. The video image processing system according to claim 6, wherein the image source is an image sensor or an image rendering engine.

9. The video image processing system according to claim 6, wherein the video image processing system further comprises:
an electrical power consuming unit; and
an electrical power managing unit configured to monitor the electrical power saved by the controlling of the bandwidth at which the image processing pipeline communicates with the system memory, and to distribute at least a fraction of the saved electrical power to the electrical power consuming unit.

10. The video image processing system according to claim 6, wherein the image processing system is implemented in a camera, such as a monitoring camera.

11. The video image processing system according to claim 6, wherein the video image processing pipeline controller is further configured to, in response to the current frame rate drops below the target frame rate, increase the bandwidth to a smallest previous bandwidth at which the current frame rate did not drop below the target frame rate.

12. The video image processing system according to claim 6, wherein the target frame rate is an original frame rate.

13. The video image processing system according to claim 6, wherein the video image processing pipeline controller is further configured to globally control the bandwidth of a plurality of memory access channels.

14. The video image processing system according to claim 6, wherein the video image processing pipeline controller is further configured to individually control the bandwidth in each of a plurality of memory access channels.

15. A method of reducing a peak power consumption in a video image processing pipeline configured to process video image data into a video stream, the video image processing pipeline comprising a plurality of processing functions, wherein each processing function is configured to process video image data, and while processing of video image data, the processing functions are configured to access a system memory over one or more memory access channels, the method comprising:
storing, in a memory, a target frame rate of the video image processing pipeline;
based on a current frame rate at which the video image processing pipeline produces the video stream and the target frame rate, reducing, by a video image processing pipeline controller, a bandwidth available for communications between processing functions of the video image processing pipeline and the system memory, wherein the communications use the one or more memory access channels while securing that the current frame rate does not drop below the target frame rate, wherein the reducing the bandwidth comprises decreasing the bandwidth in steps until the current frame rate drops below the target frame rate; and
in response to the current frame rate being reduced below the target frame rate, increasing the bandwidth to a bandwidth at which the current frame rate does not drop below the target frame rate.

16. The method according to claim 15, wherein the reducing the bandwidth further comprises, in response to the current frame rate drops below the target frame rate, increasing the bandwidth to a smallest previous bandwidth at which the current frame rate did not drop below the target frame rate.

17. A non-transitory computer readable recording medium having recorded thereon program code which when executed on a device having processing capabilities is configured to cause the device to perform operations for reducing a peak power consumption in a video image processing pipeline configured to processes video image data into a video stream, the video image processing pipeline comprising a plurality of processing functions, wherein each processing function is configured to process video image data, and while processing of video image data, the processing functions are configured to access a system memory over one or more memory access channels, the operations comprising:
storing, in a memory, a target frame rate of the video image processing pipeline;
based on a current frame rate at which the video image processing pipeline produces the video stream and the target frame rate, reducing, by a video image processing pipeline controller, a bandwidth available for communications between processing functions of the video image processing pipeline and the system memory, wherein the communications use the one or more memory access channels while securing that the current frame rate does not drop below the target frame rate, wherein the reducing the bandwidth comprises decreasing the bandwidth in steps until the current frame rate drops below the target frame rate; and in response to the current frame rate being reduced below the target frame rate, increasing the bandwidth to a bandwidth at which the current frame rate does not drop below the target frame rate.

* * * * *